(12) United States Patent
Gutierez-Castaneda et al.

(10) Patent No.: US 8,744,768 B2
(45) Date of Patent: Jun. 3, 2014

(54) METHOD OF PLANNING, TRAJECTORY COMPUTATION, PREDICTIONS AND GUIDANCE FOR COMPLIANCE WITH AN AIRCRAFT FLYPAST TIME CONSTRAINT

(75) Inventors: Manuel Gutierez-Castaneda, Toulouse (FR); Philippe Chaix, Tournefeuille (FR); Benoît Dacre-Wright, Lauzerville (FR)

(73) Assignee: Thales, Neuilly sur Seine (FR)

( * ) Notice: Subject to any disclaimer, the term of this patent is extended or adjusted under 35 U.S.C. 154(b) by 471 days.

(21) Appl. No.: 12/955,832

(22) Filed: Nov. 29, 2010

(65) Prior Publication Data

US 2011/0295501 A1 Dec. 1, 2011

(30) Foreign Application Priority Data

Nov. 27, 2009 (FR) ...................................... 09 05723

(51) Int. Cl.
*G01C 21/00* (2006.01)
*G05D 1/00* (2006.01)
*G08G 5/00* (2006.01)
*G06F 19/00* (2011.01)

(52) U.S. Cl.
CPC ................ *G05D 1/00* (2013.01); *G05D 1/0005* (2013.01); *G08G 5/003* (2013.01); *G08G 5/0052* (2013.01); *G06F 19/00* (2013.01)
USPC ............... 701/528; 701/7; 701/121; 701/465; 701/467; 340/976; 340/977; 340/978

(58) Field of Classification Search
CPC ....... G05D 1/00; G05D 1/0005; G08G 5/003; G08G 5/0052; G06F 19/00
USPC .......... 701/411, 467, 7, 121, 465; 73/114.52; 340/976, 977, 978
See application file for complete search history.

(56) References Cited

U.S. PATENT DOCUMENTS

| | | | | |
|---|---|---|---|---|
| 4,792,906 | A * | 12/1988 | King et al. | 701/5 |
| 5,121,325 | A * | 6/1992 | DeJonge | 701/123 |
| 5,408,413 | A | 4/1995 | Gonser et al. | |
| 6,507,782 | B1 * | 1/2003 | Rumbo et al. | 701/121 |
| 6,922,631 | B1 * | 7/2005 | Dwyer et al. | 701/528 |
| 6,970,784 | B2 * | 11/2005 | Shinagawa | 701/465 |
| 7,366,591 | B2 * | 4/2008 | Hartmann et al. | 701/4 |
| 7,676,303 | B2 * | 3/2010 | Hanel | 701/3 |

(Continued)

FOREIGN PATENT DOCUMENTS

| | | |
|---|---|---|
| EP | 0 250 140 A2 | 12/1987 |
| EP | 1 770 365 A1 | 4/2007 |

(Continued)

*Primary Examiner* — Tuan C. To
(74) *Attorney, Agent, or Firm* — Baker & Hostetler LLP

(57) ABSTRACT

A method and device establishes trajectory planning, predictions and guidance so as to obtain the satisfaction of a time constraint (RTA). This objective is achieved by undertaking a computation of a trajectory up to the point where the flypast time constraint applies, on the basis of a profile of altitude and speeds, and then by computing the profile of speeds and altitudes making it possible, throughout the computed trajectory, to comply with the RTA. The method is also a method for readapting the trajectory and the vertical profile when during a mission, the data outside the aeroplane have caused the time predictions to drift and the constraint is no longer complied with under the initial speeds and trajectory assumptions.

5 Claims, 2 Drawing Sheets

(56) References Cited

U.S. PATENT DOCUMENTS

| | | | |
|---|---|---|---|
| 8,010,267 B2 * | 8/2011 | Klooster et al. | 701/66 |
| 8,027,757 B2 * | 9/2011 | Berard | 701/14 |
| 8,150,588 B2 * | 4/2012 | Klooster | 701/66 |
| 8,155,866 B2 * | 4/2012 | Berard et al. | 701/120 |
| 8,165,734 B2 * | 4/2012 | Wachenheim et al. | 701/7 |
| 8,209,115 B2 * | 6/2012 | Lucas et al. | 701/122 |
| 8,340,843 B2 * | 12/2012 | Coulmeau et al. | 701/14 |
| 8,457,872 B2 * | 6/2013 | Deker | 701/120 |
| 8,473,120 B2 * | 6/2013 | Blanchon et al. | 701/3 |
| 2003/0105581 A1 * | 6/2003 | Walter | 701/120 |
| 2007/0100538 A1 * | 5/2007 | Wise et al. | 701/200 |
| 2007/0208465 A1 * | 9/2007 | Gremmert | 701/4 |
| 2008/0195264 A1 * | 8/2008 | Deker et al. | 701/7 |
| 2008/0228333 A1 | 9/2008 | De Menorval et al. | |
| 2008/0312776 A1 * | 12/2008 | Sylvester | 701/3 |
| 2009/0112454 A1 | 4/2009 | Wachenheim et al. | |
| 2009/0259351 A1 * | 10/2009 | Wachenheim et al. | 701/7 |
| 2010/0100308 A1 * | 4/2010 | Coulmeau et al. | 701/122 |
| 2010/0241345 A1 * | 9/2010 | Cornell et al. | 701/120 |

FOREIGN PATENT DOCUMENTS

| | | |
|---|---|---|
| FR | 2864269 A1 * | 6/2005 |
| FR | 2 913 780 A1 | 9/2008 |
| FR | 2 923 032 A1 | 5/2009 |
| WO | 2007/067326 A1 | 6/2007 |

* cited by examiner

METHOD OF PLANNING, TRAJECTORY COMPUTATION, PREDICTIONS AND GUIDANCE FOR COMPLIANCE WITH AN AIRCRAFT FLYPAST TIME CONSTRAINT

CROSS-REFERENCE TO RELATED APPLICATION

This application claims priority to foreign French patent application No. FR 0905723, filed on Nov. 27, 2009, the disclosure of which is incorporated by reference in its entirety.

FIELD OF THE INVENTION

The present invention pertains to a method of planning, trajectory computation, predictions and guidance for compliance with an aircraft flypast time constraint.

BACKGROUND

The present invention is applied to flight management systems for aircraft with or without an onboard pilot. Such systems, termed FMS ("Flight Management System"), ensure piloting assistance functions for determining the route to be followed by the aircraft so as to home in on its destination from its departure point while taking into account the constraints of a regulatory and operational nature to be complied with, and especially constraints relating to time of flypast and of arrival at destination.

The movements of aircraft between a departure airport and a destination airport form the subject of preparation leading to the formulation of a more or less detailed administrative document called the flight plan which assembles a collection of details relevant to the progress of the flight. This flight plan is established, firstly, for the benefit of the air traffic control authorities (airports, air traffic controls, authorities, etc.). It mentions, among other information, the identity and the type of the aircraft, as well as a summary definition of the scheduled route listing a string of waypoints linking the takeoff runway used at the departure airport to the landing runway scheduled at the destination airport, overflight constraints associated with the waypoints, the scheduled times of overflight of the waypoints, as well as optionally, the regulatory procedures for the approach followed on departure and on arrival and the air corridors employed.

The piloting of an aircraft is increasingly automated. It is performed by altering the orientations of movable surfaces (aerofoils, flaps, etc.) and altering the output of the engine or engines by way of actuators receiving position setpoints formulated by equipment termed "flight controls" so as to maintain the aircraft in a given attitude, prescribed by the pilot or by an automated facility.

The flight controls constitute, together with the actuators, a first level of equipment which is distinguished from the other levels by the fact that it involves flight equipment indispensable to the pilot for acting on the aerofoils, flaps and engines. This first level of flight equipment is often supplemented with a second and a third level of flight equipment which consist of an automatic pilot/flight director and of a flight management computer facilitating the pilot's task and which are distinguished from the first level of flight equipment by the fact that the pilot could, strictly speaking, do without them.

The automatic pilot/flight director facilitates the pilot's task in the following of setpoints for heading, altitude, speed, etc. It operates in two possible ways: "flight director" operation where it indicates to the pilot, by way of viewing screens, the commands to be given to the flight controls so as to follow a setpoint and "automatic pilot" operation where it acts additionally on the flight controls so as to automatically follow the parametrized setpoint.

The flight management computer acts on the flight controls by way of the automatic pilot/flight director. It ensures various functions described in the ARINC 702 standard of December 1996 known by the name: "Advanced Flight Management Computer System", including:

a function for inputting the summary definition appearing in the flight plan, for the route scheduled, that is to say of the string of waypoints linking the takeoff runway used at the departure airport to the landing runway scheduled at the destination airport with the overflight constraints associated with the waypoints and their scheduled overflight times as well as the departure and arrival procedures and optionally the air corridors (or "airways") employed, a function for formulating a 4D trajectory (Altitude+position+Speed) employing the route to be followed defined summarily in the flight plan while complying with the aircraft's performance and the flight constraints encountered along the 4D trajectory adopted, and a guidance function engendering, by way of the automatic pilot/flight director, piloting commands and/or setpoints relating to the management of the thrust of the engines and of the aerodynamic configuration of the aircraft so as to follow the 4D trajectory formulated.

During an approach phase preceding a landing, an aircraft generally descends from its cruising altitude to an intermediate altitude where it holds a deceleration pattern in the course of which it consumes its inertia until it reaches a speed compatible with a landing and aligns itself with the axis of the destination landing runway, on a descent plan allowing its wheels to touch down at the runway entrance. The trajectory of the approach phase as well as the speeds of traversal of the various portions of this trajectory often form the subject of regulation termed the runway approach procedure defined by a series of waypoints which lead to the entrance of the chosen runway and which are associated with local flight constraints (altitudes, speed, etc.).

The flight management computer, when it has been parametrized at the start of a mission with a flight plan comprising a destination landing runway approach procedure, can, once its guidance function has been activated, ensure the guidance of the aircraft in the course of this approach phase, by providing the automatic pilot/flight director with the commands necessary for on the one hand, reducing the speed of the aircraft while progressively altering its aerodynamic configuration (extension of the flaps, lift-enhancing slats, etc.) so as to preserve its lift and maintain its stability at low speed and on the other hand, fly past the waypoints imposed by the regulatory approach procedure while complying with the local flight constraints associated therewith.

As mentioned hereinabove, among the constraints that must be taken into account by the FMS of an aircraft, that which relates to the scheduled time of arrival at a given point of the flight plan with fixed termination, termed the RTA ("Required Time for Arrival"), depends on parameters such as the context of the air traffic control, termed ATC (arrival time slots, arrivals management system and airport management system, entry to zones of dense traffic), the workload of the pilots and the comfort of the passengers. Hereinafter in the text, the parameters, such as the aircraft flight speed and the waypoints of the aircraft, relating to this RTA constraint and making it possible to comply therewith, will simply be called the "RTA speeds", "RTA points", ... while the RTA constraint will simply be called the RTA.

FIG. 1 presents the functional architecture of a conventional FMS 1. This is a computer which determines the geometry of the 4D profile (namely the 3 dimensions in space plus one time dimension speeds-profile). Such a system forms the subject of the ARINC 702 standard (Advanced Flight Management Computer System, December 1996). It ensures all or some of the following functions:

- navigation (LOCNAV) 2, for performing optimal location of the aircraft as a function of the means SL of geo-location (GPS, GALILEO, VHF radio beacons, inertial platforms);
- flight plan (FPLN) 3, for inputting the geographical elements constituting the skeleton of the route to be followed (departure and arrival procedures, waypoints, aerial routes;
- navigation database (NAV DB) 4, for constructing geographical routes and procedures with the help of data included in the bases (points, beacons, interception or altitude "legs", etc.);
- performance database (PERF DB) 5 containing the aerodynamic parameters and the characteristics of the engines of the craft;
- lateral trajectory (TRAJ) 6: for constructing a continuous trajectory on the basis of the points of the flight plan, complying with the aircraft performance and the confinement constraints (RNP);
- predictions (PRED) 7: for constructing a vertical profile optimized on the basis of the lateral trajectory;
- guidance (GUIDANCE) 8: for guiding the aircraft in the lateral and vertical planes on its 3D trajectory, while optimizing the speed. It is linked, if appropriate, to an automatic pilot 9;
- digital data link (DATALINK) 10: for communicating with the control centres and other aircraft (C-A).

The flight plan is entered by the pilot with the aid of a man-machine interface 11 (or through a data link termed "Datalink") with the help of the data contained in the navigation database 4. This plan comprises a succession of segments called "legs" which are formed of a termination and of a geometry (turn, great circle, rhumb line, etc.). These "legs" are standardized at the international level in an AEEC document (ARINC 424).

The pilot then enters the parameters of the aircraft: weight, set of cruising levels, one or more optimization criteria (type of performance, etc.). This information thus entered into the FMS allows the TRAJ and PRED modules to compute respectively the lateral trajectory and the vertical profile (altitude/speed) minimizing the cost according to given criteria.

Current FMS systems, although comprising the functions listed hereinabove, do not make it possible to establish an optimal planning of trajectory of the predictions and of guidance to take account of a flypast and arrival time constraint. Indeed, in these current FMS systems, the trajectory planning calls upon schemes based on the pre-existence of a "cost index" table (time/fuel cost ratio) and upon a limited adaptation of the speeds profile in the climb and descent phases (see for example U.S. Pat. No. 5,121,325) or on a readjustment of the ground speeds "leg" by "leg" (see for example patent US 2003-6507782), based on a trajectory computation as a function of wind and speed. The drawbacks of such systems are: the non-optimization of the time authority on the mission if using the "cost index", the total dependency of the method in relation to the pre-existence of the said "cost index" table, the generation of numerous different speed segments when using "leg" by "leg" optimization and the non-precision of the system based on the "legs" when these exist in small number in the flight plan.

SUMMARY OF THE INVENTION

The present invention provides a method of planning, trajectory computation, predictions and guidance making it possible to comply with at least one time constraint, doing so while executing a minimum of operations. Furthermore, this method must make it possible to readapt the trajectory and the vertical profile when during a mission, data outside the aircraft have caused the time predictions to drift and when the constraint is no longer complied with under the initial speeds and trajectory assumptions. Other objectives of the invention are: to ensure the stability of the speed setpoints and of the speeds profile throughout the whole trajectory, the best possible precision in the computations, to ensure good robustness to randomness, to determine a suitably adapted time window and independence of the results with respect to flight costs.

The method in accordance with the invention is a method of planning, trajectory computation, predictions and guidance for compliance with an aircraft flypast time constraint, starting from a database of performance of the aircraft and current conditions of the flight, and it is characterized in that it comprises the following steps:

- gathering of the current flight conditions,
- provision, on the basis of a library, of computations of speeds characteristic of climbing, cruising and descent, as a function of minimum, maximum and optionally optimal speeds with a view to deriving maximum benefit from the flight envelope of the aeroplane and for the requirement of achieving the lowest possible fuel consumption,
- management of the predictions of lateral trajectory and of profile of altitude and of speeds (4D trajectory) and consideration of the predictions of the weight of the aircraft throughout the whole trajectory,
- definition, throughout the mission profile, of the margins to be preserved for the RTA speeds with respect to the speed limits of the flight envelope,
- provision, on the basis of a given 4D profile and of the time prediction associated with the RTA point, of the factors for adapting the speeds per flight phase so as to obtain a new 4D trajectory adapted to the RTA constraint,
- control of the iterations for managing the convergence of the computations of flight duration towards the duration corresponding to compliance with the time constraint and management of the 4D reference profile,
- supervision of the current prediction of time of flypast at the RTA point, capable of signalling, alerting or controlling readjustments of the 4D profile as a function of the current compliance with the estimated time of arrival in relation to the RTA constraint.

In an advantageous manner, the method comprises a step of readapting the trajectory and the vertical profile when during a mission, the data outside the aircraft have caused the time predictions to drift and when the time constraint is no longer complied with under the initial speeds and trajectory assumptions.

Thus, the method of the invention exhibits the following advantages:

- it allows better exercise of the mission in the window of temporal capabilities, it allows total independence in relation to the "legs" or "waypoints", by providing a speeds profile based on the trajectory and its vertical profile as a function of its curvilinear abscissa, it allows re-adaptation of the speeds profile during a mission as a function of the accumulated randomness, it offers the possibility of following a mission with CAS: Mach pairs which are constant for one and the same climb or descent flight phase, it offers better stability of the given speed setpoint on flypast of the "waypoints", and it allows total adaptation of the profile of computed speeds altitudes and trajectory.

BRIEF DESCRIPTION OF THE DRAWINGS

The present invention will be better understood on reading the detailed description of an embodiment, taken by way of a nonlimiting example and illustrated by the appended drawing in which.

DETAILED DESCRIPTION

For the implementation of the method of the invention, it is necessary to have available an FMS or mission preparation equipment comprising at least the FMS sub-systems such as those described with reference to FIG. 1, except the sub-systems 2 (LOC NAV), 9 (DATA LINK) and 8 (GUIDANCE). To simplify the description, only an FMS will be dealt with hereinafter, it being understood of course that the said mission preparation equipment can be used in place thereof.

Generally, the method of the invention is based on the coupling between trajectory determination and predictions.

The method of the invention implements the following main functions:

the supervision of the speed of the aircraft by characterization of a speeds profile with the aid of tables for minimum, optimal and maximum speeds, the management of the margin of convergence of the computations of flight duration towards the duration corresponding to compliance with the time constraint and management of the 4D reference profile, the determination of factor of positioning of the result of the computation "traj-pred" (predictions of vertical profile on the basis of the lateral trajectory) to be performed with respect to the two speed domains (Mach and CAS), iterations on the predictions, continued until convergence, the parametric computation of "traj" and of "pred" as a function of the convergence iteration in which they are performed, a function for optimizing the computation of the speeds factor, the supervision of drift of the current discrepancy with respect to the RTA constraint, and a triggering of correction of the speeds and lateral trajectory (if necessary optimized) with respect to the initial establishment of the RTA speeds profile, or optionally adaptation of the guidance, a preprocessing of the initial data of the problem, so as to choose between several strategies for computing the RTA speeds profile.

Figure 1:
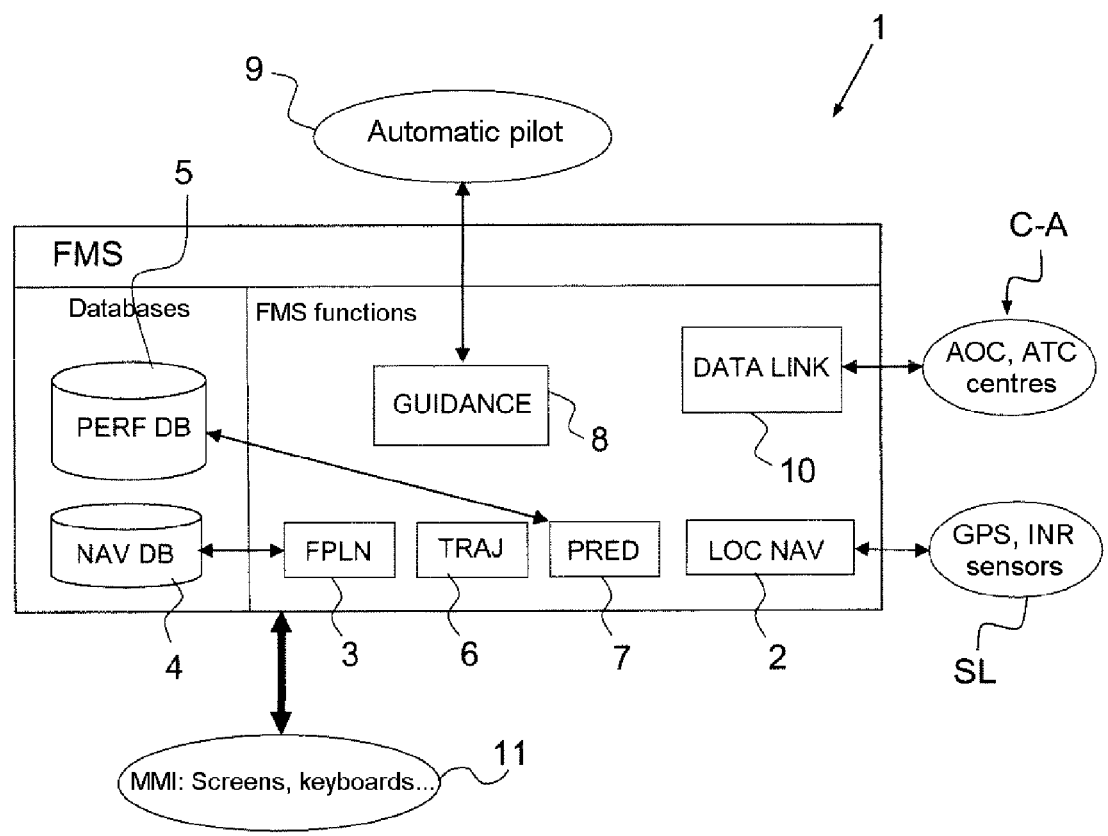
FIG. 1, already described hereinabove, is a simplified block diagram of a conventional FMS device, and, FIG. 2 is a simplified block diagram of the functional elements implemented by the method in accordance with the present invention.
Figure 2:
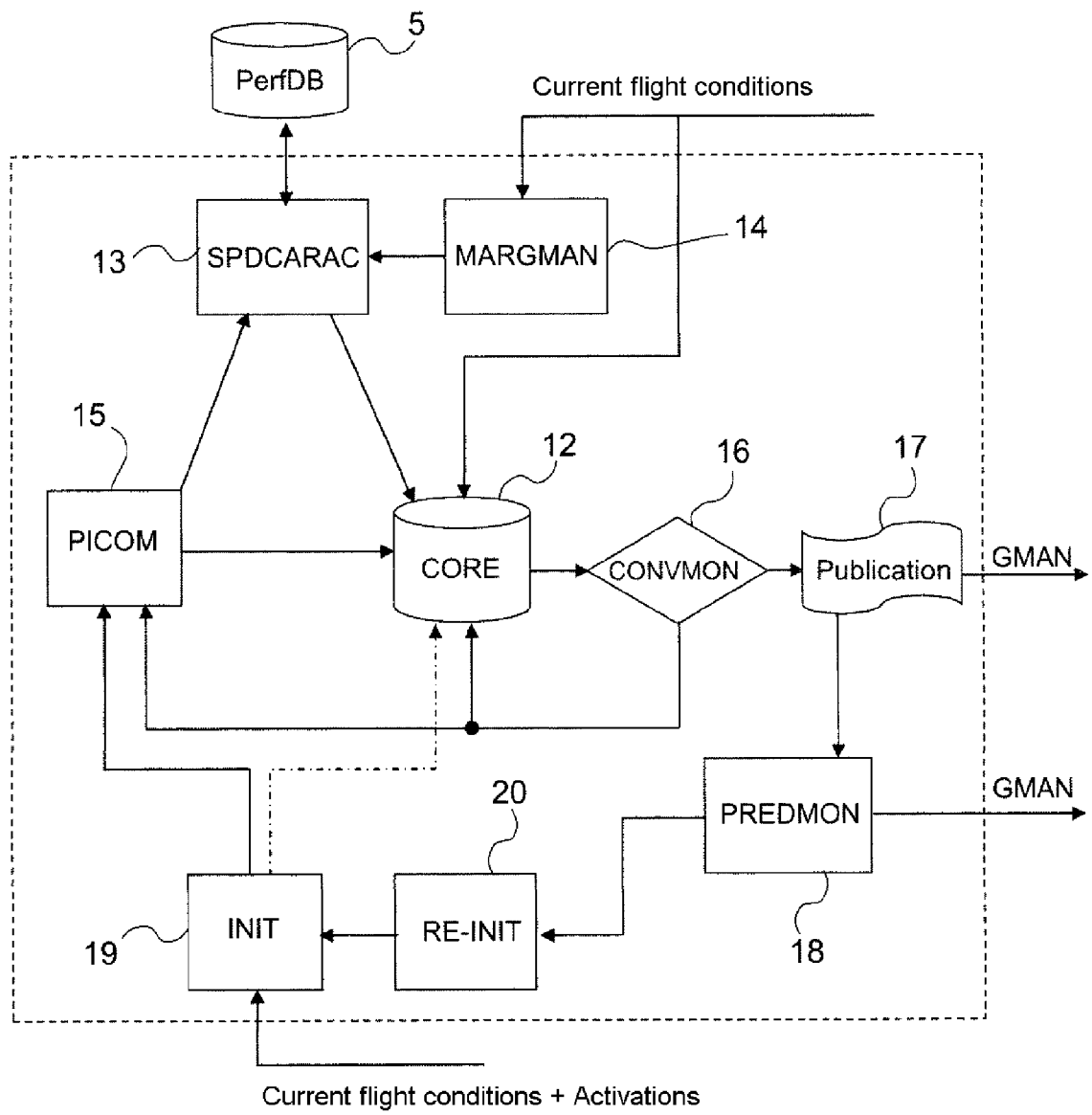

The method of the invention implements the following functions, whose mutual functional links have been shown schematically in FIG. 2. It should be noted that these following functions may be coded as separate elements, but could optionally be grouped together, like CONVMON and PICOMP for example.

a trajectory prediction manager 12 (CORE) which supervises the TRAJ and PRED modules, and which may be an FMS internal module, for coordinating the work of the TRAJ (6) and PRED (7) components of FIG. 1. This function may be ensured by a determined software sub-component which is not "embedded". This manager makes it possible to compute:

a lateral trajectory;

an altitude and speeds profile, taking into account the predictions of current aircraft mass throughout the whole journey. These two computations are the same as those done by TRAJ and PRED (6 and 7 in FIG. 1), but they are parametrized by taking account of the RTA features instead of being parametrized with respect to the customary criteria.

The objective of this prediction function of the manager CORE is to obtain a "4D" trajectory where the elements resulting from the computations of lateral trajectory (its radii and the lengths of its floating "legs") and of profile of altitude and of speeds are perfectly adapted to the altitudes, speeds and masses predicted throughout the whole trajectory.

A library 13 (SPDCARAC) making it possible to provide values of speeds characteristic of climbing, cruising and descent, as a function of parameters such as minimum speed, maximum speed, and optimal speed (the latter being optional, with a view to achieving the lowest possible fuel consumption), in conjunction with the database 5 (PERF DB) of the FMS (internal to the component PRED), may be ensured by a software sub-component which is not "embedded".

A function 14 (MARGMAN) defining, throughout the mission profile, margins to be preserved for the RTA speeds with respect to the limits (in terms of speeds) of the flight envelope. This function may be ensured by a software sub-component which is not "embedded".

A function 15 (PICOMP) which, on the basis of a given 4D profile and of the time prediction associated with the RTA point, gives factors for adapting the speeds per flight phase so as to obtain a new 4D trajectory adapted to the RTA constraint. This function may be ensured by a software sub-component which is not "embedded".

A controller of iterations 16 (CONVMON) supervising the convergence of the computations of flight duration towards the RTA points, and arbitrating the publication (function 17) and the fixing of the 4D reference profile on which the mission will be based with the aim of compliance with the RTA constraint. This function may be ensured by a software sub-component which is not "embedded".

A monitor 18 (PREDMON) of the current prediction of time of flypast at the RTA point, capable of signalling, alerting or controlling readjustments of the 4D profile as a function of the current compliance with the ETA (estimated time of arrival) in relation to the RTA constraint. This monitor possesses profiles of time margins allowing it to arbitrate its actions. These arbitrations often constitute an input datum for the client's specifications, but are easy to define by affine straight lines, for example: under 2 h of flight, authorized maximum error=36 s, up to 8 h of flight, maximum error=0.05%, and beyond 144 s.

A function 19 (INIT) for preprocessing the initial data of the problem, allowing, if possible, optimization of the computations to be performed to obtain the "RTA profile". This optimization is performed according to conventional FM (Flight Management) criteria. For example, if the RTA requested is close to the ETA (estimated time for arrival) initially predicted, it is possible not to instigate any recomputation, and thus to save CPU load and response time, or not to recompute the lateral trajectory and to only slightly adapt the speeds profile.

A function 20 (RE-INIT) for reprocessing the initial data of the problem, when the ETA prediction at the RTA point has drifted. As a function of the type of drift and of its significance, it carries out the same work as the function INIT, that is to say it decides parameters for computing the lateral trajectory and the profile of speeds (and of altitude).

The method of the invention integrates the functions mentioned hereinabove according to the following schematic:

(1) The Databases

PerfDB (5): model of performance of the aircraft, identical to that used by a conventional FMS.

(2) The Computation Functions

The operations performed by these computation functions are briefly presented hereinbelow, and for each of them, a chart lists their input and output data. These computations are performed with the aid of conventional algorithms that the person skilled in the art can easily establish on reading the descriptions hereinbelow, and which will not therefore be detailed here. It should be noted that the only "heavy" algorithmics is in PICOMP, which establishes iterations by a known scheme such as the secant scheme, or the quadratic scheme or some other prior art scheme.

INIT (19) defines the initial context in which the RTA profile computation must be executed. This function receives from RE-INIT the current discrepancy between ETA and RTA, and the current discrepancy N−1 during the previous update of the ETA.

| Input data | Data produced |
|---|---|
| Current flight plan, active segment of the flight plan, current phase Aircraft attitudes, current wind Trigger event for the RTA profile computation Current discrepancy between ETA and RTA | Current flight plan, active segment of the flight plan, current flight phase Mode of execution of CORE Relative time discrepancy to be compensated |

With regard to CORE, it will be noted that it manages the maximum number of iterations of Traj, the phases of the flight or decides whether or not to adapt the profile and the predictions.

PICOMP (15): Computes per flight phase a factor for adapting the characteristic speed:

| Input data | Data produced |
|---|---|
| Current flight phase, current (linear) abscissa on the 4D Traj | Factor PI for adapting the speeds |

| Input data | Data produced |
|---|---|
| Current state of the RTA convergence | |

MARGMAN (14): establishes margins between the real flight envelope and the envelope that is tolerated to the RTA speeds:

| Input data | Data produced |
|---|---|
| Current flight plan, active segment of the flight plan, current phase Attitudes of the aircraft, current wind | Tolerated margins, in percentage, in relation to the three characteristic tables (Vmin, Vmax, Vopti) |

SPDCARAC (13): computes characteristic speeds for each remaining flight phase until arrival at an RTA point:

| Input data | Data produced |
|---|---|
| Factor PI Data read from the performance chart (5) The tolerated margins | Pairs of CAS/Mach speeds for each flight phase |

CAS signifies "Computed Air Speed". The automatic pilots guide the speed-wise flight controls by a setpoint either CAS, or Mach.

CORE (12): computes a trajectory and a profile:

| Input data | Data produced |
|---|---|
| Current state of the convergence of the CAS/Mach pairs Current flight plan, active segment of the flight plan, current phase Attitudes, current wind Mode of execution of CORE | A 2D trajectory, a profile of altitudes; speeds, time of flypast and current weight associated with the characteristic points of the flight plan |

CONVMON (16): decides whether the current 4D trajectory is acceptable for complying with the RTA:

| Input data | Data produced |
|---|---|
| Value of the RTA constraint Computed ETA Traj and Profile of predictions | Publication of the trajectory (17) of the profile and of the initial guidance setpoint Possible rejection of the current solution with associated flypast time discrepancy Current state of the RTA convergence |

PRED MON (18): follows, throughout the progress of the flight, once an RTA solution has been published (17), the refreshing of the time predictions about the point of RTA, and acts, if appropriate, as a function of drifts of the current situation with respect to the forecasts:

| Input data | Data produced |
|---|---|
| Current flight plan, active segment of the flight plan, current phase Attitudes, current wind Current predictions of time at the RTA point | Setpoint for recomputing RTA speeds Time discrepancy to be compensated Guidance setpoint |

INIT (19):

As a function of the trigger event for the RTA computation and data of the current flight plan (which event may be for example: the input of a value of RTA, a modification of the "Time" parameter of an RTA, a lateral modification of the flight plan, a vertical modification solely of the flight plan), INIT can parametrize the execution of the Traj-Pred supervisor CORE, for example so as to preclude it having to recompute a lateral trajectory from the start if a trajectory already existed and if the basic data defining it have not changed.

It should be noted that the dotted line between INIT and CORE signifies an optional link in the case where, when an RTA computation is triggered, either one decides to retain the current Traj4D, or one decides to retain the lateral part.

PICOMP (15):

As a function of the current conditions of the flight plan, of the current profile of speeds, of the corresponding factors PI and of a time discrepancy to be compensated at the RTA point, PICOMP computes, for each flight phase, factors PI which can lie between PI min and PI max.

The factor PI=0 corresponds to a speeds reference equal to the mean of Vmin and Vmax of the flight envelope or equal to the optimal speeds of consumption if these are available.

The limits PI min and PI max are the limits of the flight envelope. PICOMP receives from MARGMAN (14) a profile of the margins to be applied to the cases PI min and PI max.

PICOMP also computes, after each execution, the time compensation trend between two executions. This value is used in the following iteration to weight the computation of a new factor PI. If the observed trend of the last compensation has been low, the trend applied to the new factor PI will be cut, with the aim of compensating for the non-linearity of the law which links the factor PI to the predicted flight time (this is the law mentioned hereinabove in regard to the computation functions, and which forms part of the improved secant scheme), and thus achieve the reference profile in an optimal number of iterations.

With the current margins, the discrepancy to be bridged, the previous factor PI and the previous trend, PICOMP computes a new factor PI aimed at obtaining speeds which will bridge the remaining time discrepancy.

The principle of the method of the invention is that if PI>0, SPDCARAC (library of computation functions) will compute speeds lying between Vmax and Vopti, and that if PI<0, the speeds will be computed between Vopti and Vmin. Vopti being either the mean of Vmin and Vmax, or an optimal speed obtained through a table.

CORE (12):

This coupled trajectory and profile computation supervisor makes it possible to obtain, inter alia, an apportionment of the speeds profile. The apportionment of the speeds profile is performed as CAS and Mach values (not as values of "Ground Speed", that is to say as values of speeds relative to the ground) thus making it possible to have on the altitude change portions, a characterization of the speed (CAS or Mach).

The speeds profile obtained is characterized by what are called vertical segments, which can be established without any relationship with the "waypoints" of the flight plan. This method makes it possible furthermore to be able to compute a complete RTA speeds profile adapted to the phases of the flight, even if the flight plan does not possess intermediate "waypoints".

Moreover, the RTA speeds profile obtained is established according to CAS and Mach values following the natural stringing together of the vertical segments of a mission, and will not witness any jumps of the speed setpoints on flypasts of "waypoints" which are solely lateral elements of the flight plan.

Interface with the Guidance

Once an RTA profile has been computed and published (17), a reference profile is created, the current speed setpoint datum (computed as a function of the active vertical segment of the profile) is dispatched to the Guidance component of the FMS (GMAN signal of FIG. 2 dispatched to the sub-assembly 8 of FIG. 1).

The functional implementation of the invention is available according to two levels of realization:

Level 1: "Predictive only"

The overall system in which the method of the invention is applied, for this level, is limited to the components 3, 6, 4, 7. It is a system of mission preparation type or else the operation of a FMS on the ground, without the Guidance module (8) and datalink module (10).

The method then operates without the function PRED-MON which may be executed only in-flight, nor the function RE-INIT (20) which is actuated by PRED-MON.

In this implementation, the initial attitude and current wind data may be static real data or simulated data or entered by the user.

Level 2: "Embedded"

The overall system in which the method is proposed corresponds to the FMS with the entirety of its components, In this implementation, the initial attitude and current wind data are the current data that the FMS receives from the avionic equipment responsible for these data.

The invention claimed is:

1. A method of planning, trajectory computation, predictions and guidance for compliance with an aircraft flypast time constraint (RTA), using a flight management system (FMS), a library, and a database of performance of the aircraft and data defining current conditions of flight, comprising the following steps:

gathering of the current flight conditions, provisioning, on a basis of the library, computations of speeds characteristic of climbing, cruising and descent, as a function of minimum, maximum, and optimal speeds with a view to deriving maximum benefit from a flight envelope of an aeroplane and for a requirement of achieving the lowest possible fuel consumption;

managing predictions of lateral trajectory and of profile of altitude and of speeds (4D trajectory) and consideration of predictions of a weight of the aircraft throughout an entire trajectory;

defining, throughout a mission profile, margins to be preserved for RTA speeds with respect to limits of the flight envelope, the margins defined using at least one of a current flight plan, an active segment of the flight plan, a current phase, attitudes of the aircraft and a characterization of a current wind, and by defining a percentage between the margins and at least one of the following characteristics:

maximum speed of the flight envelope, minimum speed of the flight envelope, and optimal speed of the flight envelope;

provisioning, on a basis of a given 4D profile and of a time prediction associated with a RTA point, of factors for adapting speeds per flight phase so as to obtain a new 4D trajectory adapted to a RTA constraint;

controlling with the FMS iterations for managing a convergence of computations of flight duration towards a duration corresponding to compliance with the time constraint and management of a 4D reference profile; and supervising with the FMS a current prediction of time of flypast at the RTA point, capable of signalling, alerting or controlling readjustments of the 4D profile as a function of a current compliance with an estimated time of arrival in relation to the RTA constraint.

2. The method according to claim 1, further comprising a prior step of preprocessing initial data so as to choose between several strategies for computing the RTA speeds profile.

3. The method according to claim 1, further comprising at least one step of readapting the trajectory and a vertical profile when during a mission, the data outside the aircraft have caused the time predictions to drift and when the RTA constraint is no longer complied with under initial speeds and trajectory assumptions.

4. The method according to claim 1, wherein an apportionment of the profile of speeds as the result of the computation of the predictions of vertical profile on the basis of a lateral trajectory is performed as CAS or MACH values along "vertical" segments and not necessarily related to points of a lateral flight plan.

5. A device for planning, trajectory computation, predictions and guidance for compliance with an aircraft flypast time constraint (RTA), using a database of performance of an aircraft and data defining current conditions of a flight, associated with one of an FMS and mission preparation equipment, comprising:

a trajectory and predictions manager;

a library of computations of characteristic speeds making it possible to provide values of speeds characteristic of climbing, cruising and descent, as a function of minimum, maximum, and optimal speeds with a view to deriving maximum benefit from a flight envelope of an aeroplane and for a requirement of achieving the lowest possible fuel consumption, in conjunction with the database;

a function defining, throughout a mission profile, margins to be preserved for RTA speeds with respect to limits of the flight envelope, the margins defined using at least one of a current flight plan, an active segment of the flight plan, a current phase, attitudes of the aircraft and a characterization of a current wind, and by defining a percentage between the margins and at least one of the following characteristics:

maximum speed of the flight envelope, minimum speed of the flight envelope, and optimal speed of the flight envelope;

a function which, on a basis of a given 4D profile and of a time prediction associated with a RTA point, gives factors for adapting speeds per flight phase so as to obtain a new 4D trajectory adapted to a RTA constraint, a controller that controls iterations supervising a convergence of computations of flight duration to RTA points, and arbitrating a publication and fixing of a 4D reference profile on which a mission will be based with an aim of compliance with the RTA constraint, and a monitor that monitors a current prediction of time of flypast at a RTA point, capable of signalling, alerting or controlling readjustments of the 4D profile as a function of a current compliance with an estimated time of arrival in relation to the RTA constraint.

* * * * *